(No Model.)  2 Sheets—Sheet 1.
J. C. POTTER.
FEEDING MECHANISM FOR MACHINES FOR OPENING COTTON.
No. 528,389. Patented Oct. 30, 1894.
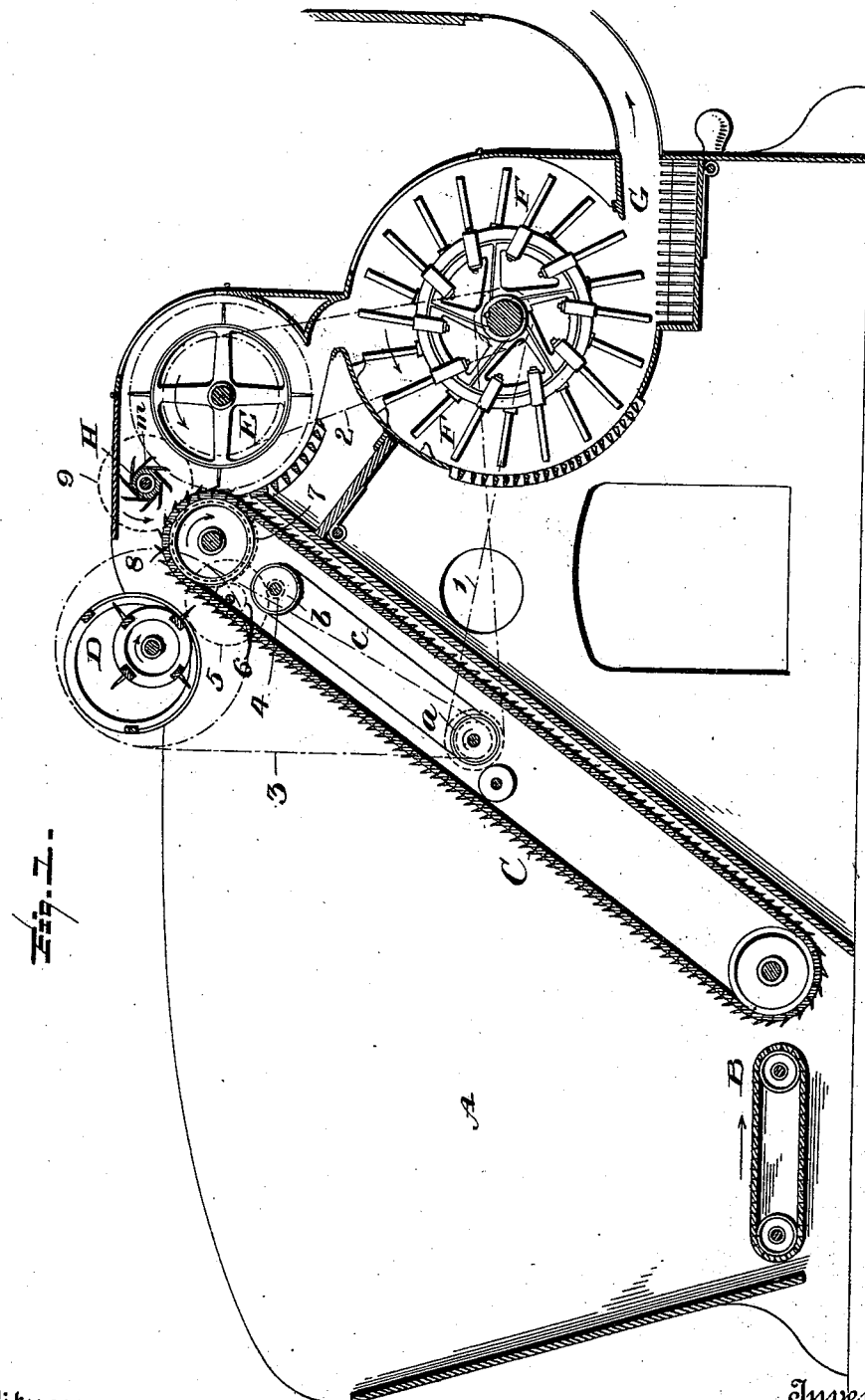
Witnesses
L. C. Hills
O. H. Fowler
Inventor:
James C. Potter
by his Attorney (No Model.) 2 Sheets—Sheet 2.
J. C. POTTER.
FEEDING MECHANISM FOR MACHINES FOR OPENING COTTON.
No. 528,389. Patented Oct. 30, 1894.
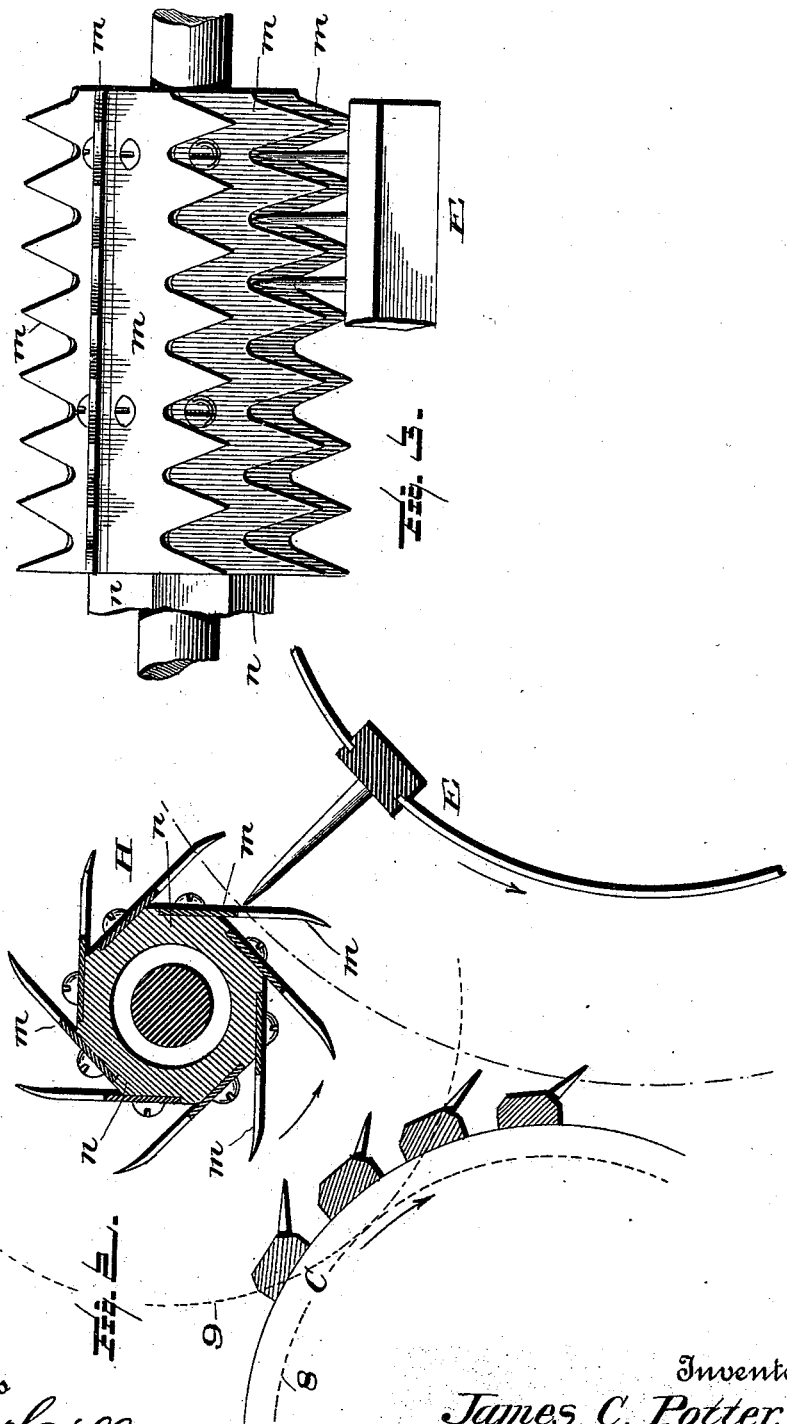
Witnesses
L. C. Hills.
O. H. Fowler.
Inventor:
James C. Potter.
by Marallus Bailey
his Attorney

UNITED STATES PATENT OFFICE.

JAMES C. POTTER, OF PAWTUCKET, RHODE ISLAND.

FEEDING MECHANISM FOR MACHINES FOR OPENING COTTON.

SPECIFICATION forming part of Letters Patent No. 528,389, dated October 30, 1894.

Application filed July 18, 1894. Serial No. 517,898. (No model.)

*To all whom it may concern:*

Be it known that I, JAMES C. POTTER, of Pawtucket, in the State of Rhode Island, have invented a certain new and useful Improvement in Feeding Mechanisms for Machines for Opening and Preparing Cotton, &c., of which the following is a specification.

My invention relates to what are known as self feeders for cotton openers and like machinery. The self feeding mechanism comprises among other things a spiked lifting apron or its equivalent such as a large spiked lifting drum or cylinder or a series of spiked lifting rolls, an equalizing doffer or comb for regulating the supply of cotton or other fibrous material delivered by the lifting apron and a feeder beater which after the cotton has been acted on by the doffer or comb, and has been carried forward over the top of the lifting apron, strips it from the apron and beats or partly opens it. The feeder beater revolves at considerable speed and acts upon the cotton with teeth or projecting flanges or pins with which it is provided.

In apparatus of this kind, the cotton upon the apron after passing the regular comb is liable to be torn off in large wads or pieces by the feeder beater, and to be carried forward in this shape to the great disadvantage of the opening and trash removing operation. To remedy this I provide a holding device in the nature of a toothed holding roll, between which and the apron the cotton which passes to the feeder beater is held. This toothed holding roll is located between the feeder beater and the comb or doffer and revolves at the same surface speed with the apron; but its teeth or spikes unlike those of the apron are not forwardly inclined but are so shaped and located as by catching into the cottonbat to resist any forward pull on the same that might be exerted by the feeder beater. The roll also is placed as near as possible to the feeder beater so that, inasmuch as the stock can only be torn apart at some point between the holding roll and the feeder beater, it will necessarily be separated into very much smaller pieces than otherwise would be the case, and thus will be more thoroughly opened and freed from seed, trash and other impurities. The toothed holding roll indeed is preferably placed so near to the feeder beater that the beater pins pass between the teeth of the roll and thus act to strip from the latter any stock which might otherwise adhere to it.

To enable others skilled in the art to understand and use my invention I will now proceed to describe with more particularity the manner in which the same is or may be carried into effect by reference to the accompanying drawings, in which—

Figure 1 is a longitudinal vertical section partly in elevation of a self-feeding apparatus embodying my invention. Fig. 2 is an enlarged sectional elevation of the toothed holding roll, and part of the spiked apron and feeder beater. Fig. 3 is an elevation of part of the toothed holding roll and feeder beater.

The apparatus shown in the drawings in illustration of my invention is of the self-feeder type, comprising a hopper A, a traveling apron bottom B, a spiked lifting apron C, an equalizing doffer or comb D, and a feeder beater E which strips the cotton from the lifting apron. Beyond the feeder beater E is an opener beater F, after passing which the cotton is conveyed through the trunk or passage G to any suitable or desired point. With the spiked apron is combined a speed regulating mechanism comprising the driving and driven cones $a$, $b$, and their connecting belt $c$, which is shifted on the cones by a belt shipper not shown. The moving parts are power driven, and their driving belting and gearing are indicated by dotted lines. The driving cone $a$ gets its movement from the opener beater F by a cross belt 1. The feeder beater gets its movement from the same source by a belt 2. The equalizing doffer or comb D gets its movement from the driving cone $a$ by a belt 3, and the lifting apron B gets its movement from the driven cone through gearing 4, 5, 6, 7 as shown. The traveling apron B gets its movement from the lifting apron C or from any other convenient source.

I come now to the device in which my invention consists, viz: the toothed holding roll H in its combination with the lifting apron and the feeder beater. This roll is located above the spiked apron between the feeder beater E and the comb D, so that all the cotton that passes to the feeder beater E must pass through the throat or passage between the toothed holding roll and apron. This roll is power driven and is geared to the spiked lifting apron, as indicated at 8, 9, so as to revolve in the same direction and at the same surface speed with the apron. The teeth of the holding roll however are inclined not forwardly as in the apron, but rearwardly relatively to the direction of the feed so that they will resist any abnormal forward pull on the stock held between them and the spiked apron. The cotton at the point where the toothed holding roll is located is indeed handled quite as it would be by a pair of feed rolls, except that it is not appreciably compressed but is simply held back by the teeth of the holding roll to the extent to prevent any large pieces or lumps of stock from being torn off and carried forward bodily by the feeder beater E as hereinbefore explained. Any tearing apart of the stock takes place only between the toothed holding roll and the beater, and as this distance is small the stock necessarily will be separated into small pieces—very much smaller pieces than would be the case were the roll taken away, because then large pieces of stock extending back as far as the comb D might be torn off and carried bodily forward by the feeder beater pins. The feeder beater and toothed holding roll are shown as set so near together that the beater pins will pass through the spaces between the teeth of the holding roll, and this arrangement I much prefer inasmuch as under these conditions the feeder beater acts as a stripper for the roll, removing any stock which may adhere to the teeth of the latter and preventing strings of cotton from accumulating and winding upon the roll. The toothed roll may be made in any convenient or preferred way. I prefer to make it of flat toothed plates $m$ secured to a polygonal body $n$ by screws or otherwise, as indicated in the drawings.

For the lifting apron I may substitute a spiked drum or other known equivalent; and I desire to be understood as including any such substitution in my claim.

Having now described my invention, what I claim herein as new, and desire to secure by Letters Patent, is—

The combination of the spiked lifting apron, the toothed holding roll and the feeder beater set so that its pins shall pass between the teeth of the holding roll, substantially as and for the purposes hereinbefore set forth.

In testimony whereof I affix my signature in presence of two witnesses.

JAMES C. POTTER.

Witnesses:
SOLOMON ROBERTSON,
THOMAS P. BARNEFIELD.